(12) United States Patent  
Kolich et al.

(10) Patent No.: US 9,340,131 B1  
(45) Date of Patent: May 17, 2016

(54) HEAD RESTRAINT WITH A MULTI-CELL BLADDER ASSEMBLY

(71) Applicant: Ford Global Technologies, LLC, Dearborn, MI (US)

(72) Inventors: Michael Kolich, Windsor (CA); Amber LaVerne Hall, Oak Park, MI (US); Sean David Fannin, Taylor, MI (US); Keith Allen Godin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/534,296

(22) Filed: Nov. 6, 2014

(51) Int. Cl.
| | |
|---|---|
| *B60N 2/48* | (2006.01) |
| *B60N 2/52* | (2006.01) |
| *B60N 2/64* | (2006.01) |
| *A47C 27/08* | (2006.01) |
| *A47C 27/10* | (2006.01) |

(52) U.S. Cl.
CPC ............ *B60N 2/4805* (2013.01); *A47C 27/088* (2013.01); *A47C 27/10* (2013.01); *B60N 2/64* (2013.01); *B60N 2002/4888* (2013.01)

(58) Field of Classification Search
CPC . B60N 2/4805; B60N 2/64; B60N 2002/4888
USPC ................. 297/216.12, 284.6, 284.9, 452.41, 297/391–410
See application file for complete search history.

(56) References Cited

U.S. PATENT DOCUMENTS

| | | | |
|---|---|---|---|
| 2,958,369 A | 11/1960 | Pitts et al. | |
| 3,403,938 A | 10/1968 | Cramer et al. | |
| 3,795,021 A * | 3/1974 | Moniot | A47C 7/38 297/391 X |
| 3,929,374 A | 12/1975 | Hogan et al. | |
| 4,017,118 A * | 4/1977 | Cawley | A61G 15/02 297/391 X |
| 4,324,431 A | 4/1982 | Murphy et al. | |
| 4,334,709 A | 6/1982 | Akiyama et al. | |
| 4,353,595 A | 10/1982 | Kaneko et al. | |
| 4,415,203 A * | 11/1983 | Cawley | A61G 15/10 297/391 |
| 4,541,669 A | 9/1985 | Goldner | |
| 4,580,837 A * | 4/1986 | Bayley | B60N 2/66 297/284.6 |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30; 4273-4285; May 3, 2009; (13 pages).

(Continued)

*Primary Examiner* — Rodney B White
(74) *Attorney, Agent, or Firm* — Vichit Chea; Price Heneveld LLP

(57) ABSTRACT

A vehicle seating assembly includes a pump and a headrest. The headrest has a support base, a flexible foam layer coupled with the support base, a flexible substrate overlying the foam layer and defining an outer surface, and an inflatable bladder assembly positioned between the base and the foam layer. The bladder assembly has a plurality of cells corresponding to respective regions of the outer surface that are independently operable between inflated and deflated conditions by the pump. The seating assembly further includes a control operably coupled to the pump.

18 Claims, 5 Drawing Sheets

(56) References Cited

U.S. PATENT DOCUMENTS

| | | | |
|---|---|---|---|
| 4,592,588 A * | 6/1986 | Isono | A47C 7/022 297/284.6 X |
| 4,629,248 A | 12/1986 | Mawbey | |
| 4,634,179 A * | 1/1987 | Hashimoto | A47C 7/467 297/284.3 |
| 4,655,505 A * | 4/1987 | Kashiwamura | A47C 7/467 297/284.6 |
| 4,707,027 A * | 11/1987 | Horvath | B60N 2/4415 297/284.6 |
| 4,720,141 A | 1/1988 | Sakamoto et al. | |
| 4,720,146 A * | 1/1988 | Mawbey | B60N 2/4415 297/410 X |
| 4,833,614 A * | 5/1989 | Saitoh | B60N 2/0224 296/65.16 |
| 4,856,844 A * | 8/1989 | Isono | B60N 2/4415 297/284.6 X |
| 4,915,447 A | 4/1990 | Shovar | |
| 4,965,899 A * | 10/1990 | Sekido | A47C 4/54 297/284.6 X |
| 5,127,708 A * | 7/1992 | Kishi | A61B 5/18 297/284.6 X |
| 5,129,704 A * | 7/1992 | Kishi | B60N 2/0224 297/284.6 X |
| 5,171,062 A | 12/1992 | Courtois | |
| 5,174,526 A | 12/1992 | Kanigowski | |
| 5,263,765 A * | 11/1993 | Nagashima | A47C 7/467 297/284.6 X |
| 5,320,409 A * | 6/1994 | Katoh | B60N 2/0232 297/284.6 |
| 5,518,294 A | 5/1996 | Ligon, Sr. et al. | |
| 5,560,681 A | 10/1996 | Dixon et al. | |
| 5,570,716 A * | 11/1996 | Kamen | B60N 2/4415 137/223 |
| 5,647,635 A | 7/1997 | Aumond et al. | |
| 5,662,384 A * | 9/1997 | O'Neill | A47C 4/54 297/284.6 |
| 5,678,891 A * | 10/1997 | O'Neill | A47C 4/54 297/284.6 X |
| 5,707,109 A * | 1/1998 | Massara | B60N 2/4415 297/284.9 |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,893,609 A * | 4/1999 | Schmidt | A47C 7/467 297/284.6 |
| 5,902,014 A | 5/1999 | Dinkel et al. | |
| 5,913,568 A | 6/1999 | Brightbill et al. | |
| 5,951,039 A | 9/1999 | Severinski et al. | |
| 5,975,637 A * | 11/1999 | Geuss | B60N 2/002 297/391 X |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,158,812 A * | 12/2000 | Bonke | B60N 2/4805 297/391 X |
| 6,179,379 B1 | 1/2001 | Andersson | |
| 6,189,966 B1 | 2/2001 | Faust et al. | |
| 6,196,627 B1 | 3/2001 | Faust et al. | |
| 6,199,900 B1 * | 3/2001 | Zeigler | B60N 2/4829 297/216.12 X |
| 6,203,105 B1 * | 3/2001 | Rhodes, Jr. | A47C 4/54 297/281.1 |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,474,733 B1 * | 11/2002 | Heilig | B60N 2/4415 297/391 X |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,568,754 B1 * | 5/2003 | Norton | B60N 2/4864 297/216.12 |
| 6,619,605 B2 | 9/2003 | Lambert | |
| 6,682,059 B1 * | 1/2004 | Daniels | A47C 4/54 297/284.6 X |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,059,678 B1 * | 6/2006 | Taylor | A47C 7/405 297/284.6 X |
| 7,093,898 B2 * | 8/2006 | Ladron De Guevara | A47C 4/54 297/284.6 X |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,213,883 B2 * | 5/2007 | Charnitski | B60N 2/4882 297/391 |
| 7,229,118 B2 | 6/2007 | Saberan et al. | |
| 7,234,771 B2 | 6/2007 | Nakhla | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,850,235 B2 * | 12/2010 | Veine | B60N 2/4864 297/216.12 |
| 7,857,381 B2 | 12/2010 | Humer et al. | |
| 7,871,126 B2 | 1/2011 | Becker et al. | |
| 7,878,596 B2 * | 2/2011 | Brunner | B60N 2/4832 297/410 X |

(56) References Cited

U.S. PATENT DOCUMENTS

| | | | |
|---|---|---|---|
| 7,887,094 B2* | 2/2011 | Sakaida | B60N 2/4808 297/391 X |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,141,945 B2* | 3/2012 | Akaike | B06N 2/4861 297/216.12 |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,678,500 B2* | 3/2014 | Lem | B60N 2/4415 297/284.6 |
| 8,794,707 B2* | 8/2014 | Bocsanyi | B60N 2/4415 297/284.6 |
| 2003/0023363 A1* | 1/2003 | Katz | B60N 2/0244 297/284.9 X |
| 2003/0038517 A1* | 2/2003 | Moran | B60N 2/4415 297/284.6 X |
| 2003/0137178 A1* | 7/2003 | Craft | A47C 7/467 297/452.41 |
| 2004/0195870 A1 | 10/2004 | Bohlender et al. | |
| 2005/0082895 A1* | 4/2005 | Kimmig | A47C 7/467 297/452.41 |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0302660 A1* | 12/2009 | Karlberg | B60N 2/4882 297/404 |
| 2009/0322124 A1 | 12/2009 | Barkow et al. | |
| 2010/0038937 A1 | 2/2010 | Andersson et al. | |
| 2010/0109397 A1* | 5/2010 | Bandurksi | B60N 2/4279 297/391 X |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1 | 3/2013 | Kulkarni et al. | |
| 2014/0032043 A1 | 1/2014 | Line et al. | |
| 2014/0265506 A1* | 9/2014 | McMillen | B60N 2/4838 297/391 X |
| 2014/0375100 A1* | 12/2014 | Reese | B06N 2/4882 297/391 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

HEAD RESTRAINT WITH A MULTI-CELL BLADDER ASSEMBLY

FIELD OF THE INVENTION

The present invention generally relates to a vehicle seating assembly. More particularly, the seating assembly includes a headrest having a bladder assembly with a plurality of inflatable cells.

BACKGROUND OF THE INVENTION

Motor vehicle seats, particularly driver seats and front passenger seats, may include a number of moveable parts for cooperatively supporting various portions of an occupant. Relative movement of the seat parts may provide for numerous modes of customizing the seating surface that the seat parts define to suit a particular user. Further, many seats include mechanisms for automated or motorized movement of the seat parts for automated movement of the seat parts into that particular configurations.

It may, accordingly, be advantageous to provide a vehicle seating assembly with increased levels of customization.

SUMMARY OF THE INVENTION

According to one aspect of the present invention, a vehicle seating assembly includes a pump and a headrest. The headrest has a support base, a flexible foam layer coupled with the support base, a flexible substrate overlying the foam layer and defining an outer surface, and an inflatable bladder assembly positioned between the base and the foam layer. The bladder assembly has a plurality of cells corresponding to respective regions of the outer surface that are independently operable between inflated and deflated conditions by the pump. The seating assembly further includes a control operably coupled to the pump.

According to another aspect of the present invention, a vehicle headrest assembly includes a support base, a flexible foam layer coupled with the support base, and a flexible fabric layer overlying the foam layer and defining an outer surface. The headrest assembly further includes an inflatable bladder assembly positioned between the base and the foam layer. The bladder assembly includes a plurality of cells corresponding to respective regions of the outer surface and independently operable between inflated and deflated conditions.

According to another aspect of the present invention, a vehicle headrest assembly includes an inflatable bladder assembly having a plurality of cells independently operable between inflated and deflated conditions. A fluid manifold has a plurality of outlets respectively associated with ones of the plurality of cells and an inlet coupled with an air supply line. The headrest assembly further includes a support base having first and second support arms, the air supply line extending through the first support arm.

The various aspects of the present invention can allow for customization of the contour of a head-contacting surface of a vehicle headrest beyond that which can be realized by known headrest adjustment mechanisms. In an example, the use of inflatable cells may require fewer moving parts and may be more resilient during an impact than certain mechanical headrest adjustments, both powered and manual.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
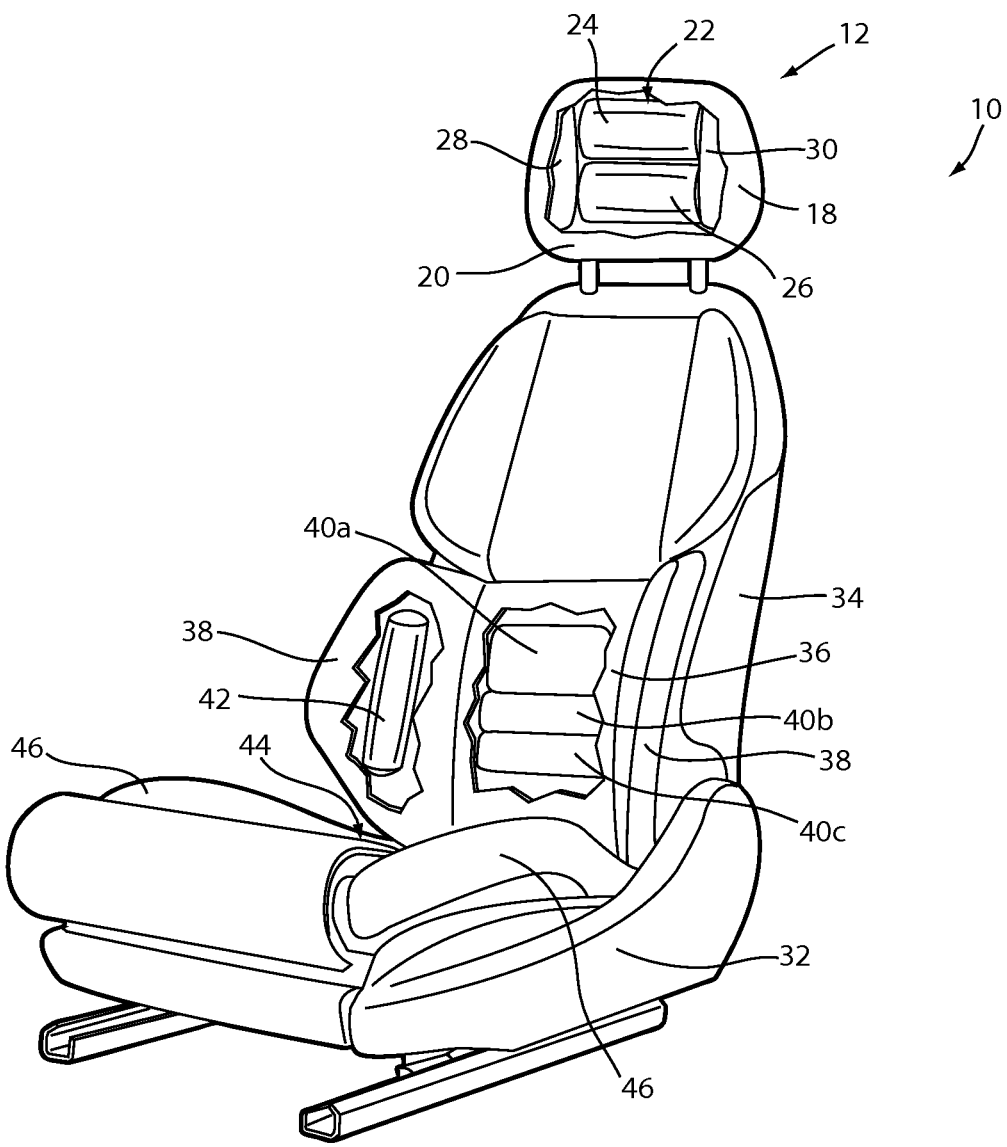
FIG. 1 is a front perspective, partial cutaway view of a vehicle seating assembly.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle seating assembly, illustrated in the form of a vehicle seat. Vehicle seat 10 includes a headrest 12, which includes a support base layer 14 (FIG. 3), a flexible foam layer 16 (FIG. 3) coupled with the support base layer 14. Headrest 12 further includes a flexible substrate 18 overlying the flexible foam layer 16 and defining an outer surface 20 of headrest 12. An inflatable bladder assembly 22 is positioned between one of the base layer 14 and flexible foam layer 16 or the flexible foam layer 16 and the substrate 18 (in FIG. 3 the bladder assembly is shown between the base layer 14 and foam layer 16). Bladder assembly 22 has a plurality of cells 24, 26, 28, and 30 corresponding to respective regions of outer surface 20 and independently operable between inflated and deflated conditions by a pump (not shown) included in the assembly with seat 10. A control (not shown) is operably coupled to the pump and may be used to control the operability of the cells 24, 26, 28, and 30 between the inflated and deflated conditions.

As further shown in FIG. 1, headrest assembly 12 can be usable in connection with a vehicle seat 10 including a cushion 32 and a seatback 34 that can be rotatably coupled with cushion 32. Headrest 12 can be coupled with seatback 34 so as to extend upwardly from to a position in a general area of the head of an occupant. Accordingly, headrest assembly 12 can provide support for the head of the occupant for purposes of comfort during ordinary use and/or restraining support for the head of the occupant in the event of a crash or the like. As further illustrated, vehicle seat 10 can include additional bladder assemblies throughout additional portions thereof. For example, seatback 34 can define a lumbar area 36 flanked by opposing seatback bolsters 38, and seatback 34 can include one or more lumbar bladders, such as bladders 40a, 40b, and 40c, as well as bladders 42 within respective ones of the seatback bolsters 38. Additional bladders can also be included within areas of cushion 32, such as within a central portion 44 of cushion 32, as well as cushion bolsters 46. Although illustrated in connection with a vehicle seat 10 having the general appearance of a front vehicle seat, the headrest assembly 12 discussed herein can be incorporated in a vehicle seat in any location, including rear bench seats (with or without additional inflatable bladder). Further, the headrest assembly 12 can be used in a number of different vehicles including, automobiles, aircraft, trains, and the like.

Figure 2:
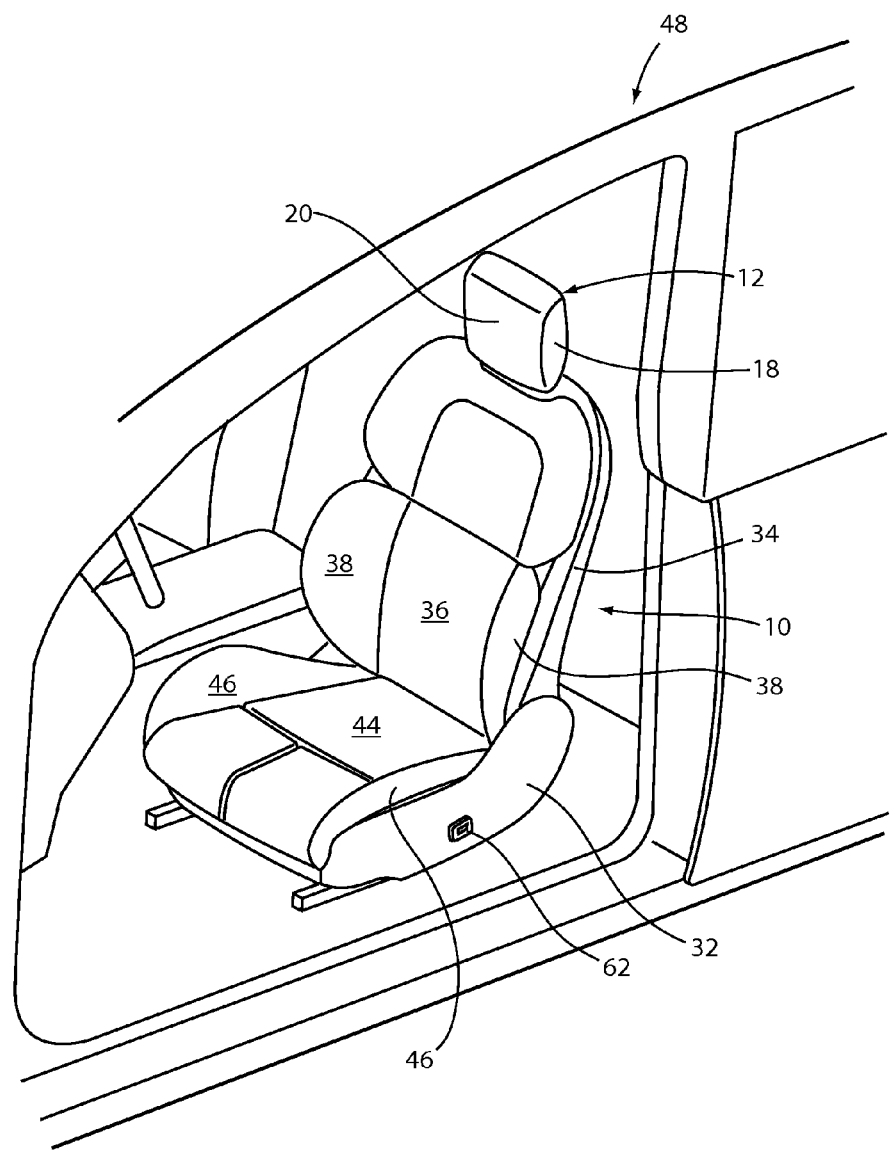
FIG. 2 is a partial front perspective view of a vehicle including the seating assembly of FIG. 1.

The bladders illustrated in FIG. 1, as well as other bladders that may be further included in seat 10 can be connected together within a series of tubes and corresponding manifolds (such as those which are described further below) to a common pump, which may be further connected to bladder assembly 22 within headrest 12. Such a pump may be disposed within the assembly of seat 10 or within another portion of the vehicle 48 (FIG. 2) in which seat 10 is included. In an example, a pump may be included in the assembly of seat 10 to provide a supply of air to selectively inflate ones of the various bladders included in seat 10, including bladder assembly 22 within headrest 12. In such an example, additional seats similar to seat 10 and also included in vehicle 48 (e.g. passenger seat and/or rear seats) may include respective bladders and a dedicated corresponding pump therein. In another example, a centrally-located pump within vehicle 48 may be connected one or more seats, each having inflatable bladders therein to provide an air supply to the seats collectively, as needed.

Bladder assembly 22, including the illustrated plurality of individual cells 24, 26, 28, and 30, can provide for custom contours of outer surface 20 of headrest 12. Such custom contours can be configured depending on, for example, the preferences of an occupant of seat 10. As discussed previously, the cells 24, 26, 28, and 30 may be individually operated between inflated and deflated positions, wherein the cells are generally thicker when in the inflated position as compared to the deflated position. Accordingly, when one of cells 24, 26, 28, and 30 is inflated, the cell may push outwardly on the structure that overlies it, which may be flexible foam layer 16 or substrate 18, in the area immediately overlying such a cell, thereby causing a corresponding portion of outer substrate 18 to move farther away from base layer 14 in an area further overlying the inflated cell. Similarly, deflation of a particular one of cells 24, 26, 28, and 30, causes the cells 24, 26, 28, and 30 to return to a relatively thinner configuration (which may correspond to lateral expansion thereof) such that, in an example, the material sheets that define the cells 24, 26, 28, and 30 move closer together and become generally more planar. Such deflation allows a corresponding area to of substrate 18 to move closer toward base layer 14, which can, in one example, correspond to the natural, formed position thereof, as well as the underlying flexible foam layer 16, if applicable. Accordingly, the aforementioned regions of outer surface 20 corresponding to the individual cells, 24, 26, 28, and 30 of bladder assembly 22 can generally correspond to areas of surface 20 that overlie at least portions of the respective cells 24, 26, 28, and 30.

In an embodiment, flexible foam layer 16 may be of a natural or synthetic foam material that is generally flexible so as to provide cushioning and absorb shocks from the head of the occupant of seat 10 thereagainst. Additionally, in the embodiment illustrated in FIG. 3 where flexible foam layer 16 overlies bladder assembly 22, flexible foam layer 16 can be of material that is flexible enough to allow for localized flexation thereof in response to inflation of one of the underlying cells 24, 26, 28, and 30, such that such individual cell inflation is perceptible to the occupant. Outer substrate 18 can be of any generally suitable material for vehicle upholstery, including various fabrics and natural or synthetic leather. Base layer 14 can be of a plastic or foam material that can be generally more rigid than the foam used for flexible foam layer 16 and further rigid enough to support the general shape of headrest 12, as well as to provide for support of the weight of the head of occupant during normal driving and further during an impact event, wherein some flexation of base layer 14 may be desired for shock absorption.

Bladder assembly 22 may be generally constructed of various assembled plastic membranes or sheets. Such plastic may be selected to provide the desired flexibility and/or elasticity for inflation of cells 24, 26, 28, and 30 as well as at least a minimum amount of air impermeability so as to maintain the cells 24, 26, 28, and 30 in an inflated state. In one example, bladder assembly 22 can comprise a plurality of individual units, each corresponding to one of cells 24, 26, 28, and 30 that can be separately coupled with base layer 14. Alternatively, bladder assembly 22 can be made of a single unit divided into the individual cells 24, 26, 28, and 30. In such an example, two plastic sheets can be overlaid with one another and heat-sealed around a perimeter thereof and around the boundaries of the individual cells 24, 26, 28, and 30.

Figure 3:
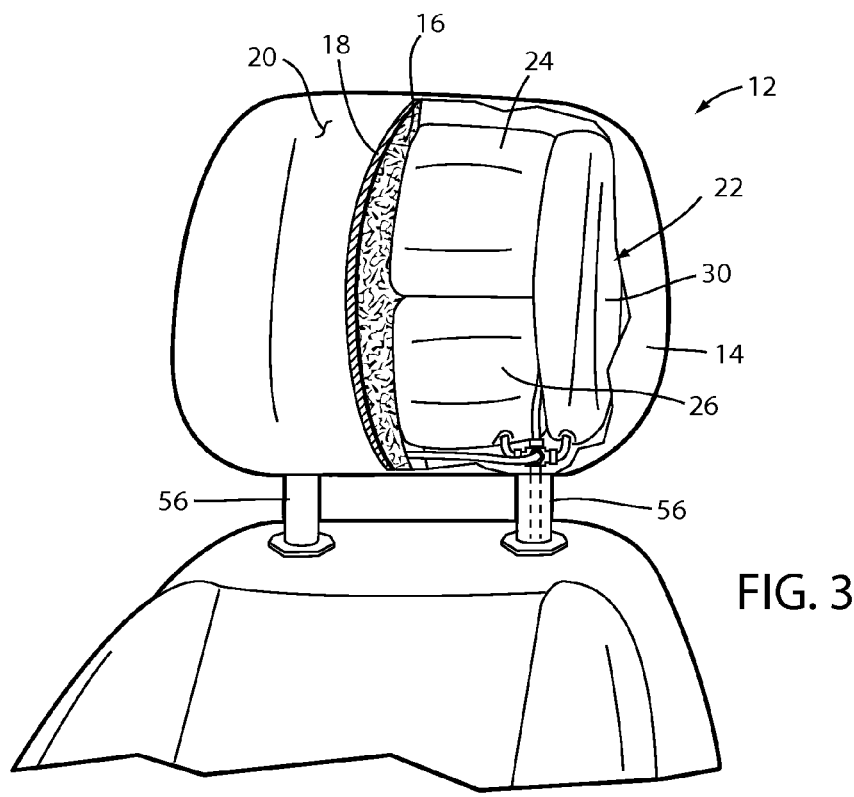
FIG. 3 is a detail, cutaway view of a headrest of the seating assembly of FIG. 1.

In either such construction, or other variations thereof, the individual cells of bladder assembly 22 can be arranged to provide for a desired configuration and arrangement of moveable regions of surface 20. As shown in FIGS. 1 and 3, bladder assembly 22 can be arranged such that cells 24 and 26 extend generally horizontally across headrest 12 and in a manner generally parallel with each other. Accordingly, cell 24 can provide for inward and outward movement of an upper portion of headrest 12 at least within a central area thereof. Similarly, cell 26 may provide for inward and outward movement of surface 20 along a lower portion of headrest 12 at least within a central area thereof. Depending on the positioning of the head of the occupant of seat 10, the upper and lower portions of surface 20 may respectively correspond with the junction between the neck and head of the occupant and the top of the back of the occupant's head.

Further, cells 28 and cell 30 may be positioned on opposite sides of cells 24 and 26 so as to extend generally vertically along opposite lateral sides of headrest 12. Such an arrangement may allow of the lateral sides of outer surface 20 to be moved inwardly and outwardly separately from the central portion of surface 20, which may allow for adjustment to the lateral concavity of surface 20, with some users potentially desiring a more concave surface 20 to cradle the head, while other may desire less concavity for increased freedom of movement or the like.

Figure 4:
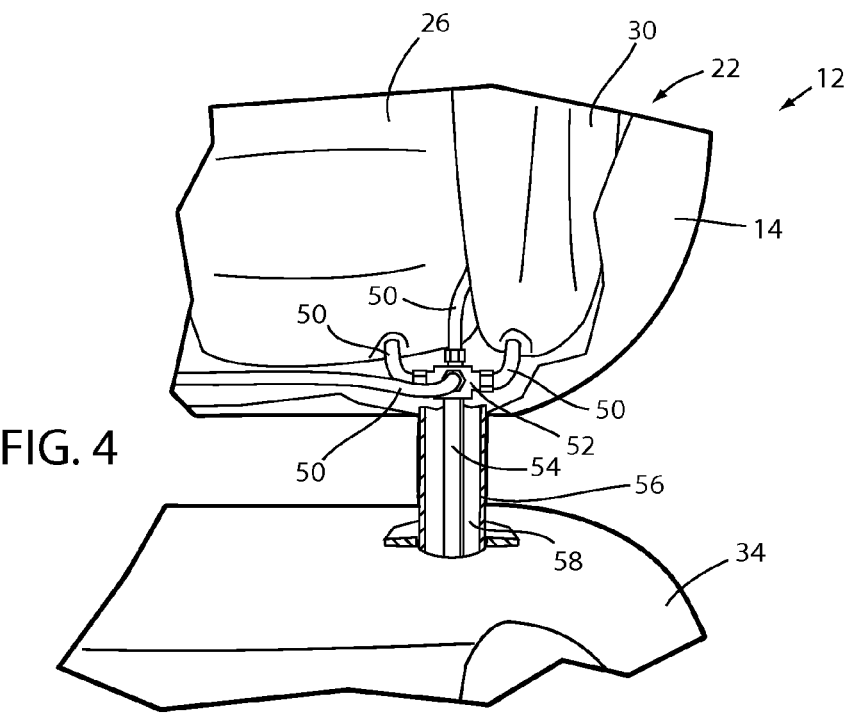
FIG. 4 is a further detail, cutaway view of the headrest of FIG. 3.

Each of the individual cells, 24, 26, 28, and 30 may include respective inlet lines 50 extending therefrom to allow a supply of air for inflation thereof. As shown in FIG. 4, such inlet lines 50 may be in the form of tubes of polymeric material or the like directly coupled with a portion of the plastic comprising the respective cell (illustrated as cells 26 and 30 in FIG. 4). In an alternative arrangement, inlet lines 50 may be formed as appendages of the respective cells 24, 26, 28, and 30 of the same material that they comprise. A manifold 52 may be connected with the inlet lines 50 and may further be connected with a supply line 54, such that manifold 52 facilitates a desired flow of air into cells 24, 26, 28, and 30. Supply line 54 may be connected with the pump, either directly or through connection with an additional manifold position in cushion 32 or seatback 34, for example for providing pressurized air to manifold 52 for distribution to bladder assembly 22.

Figure 5:
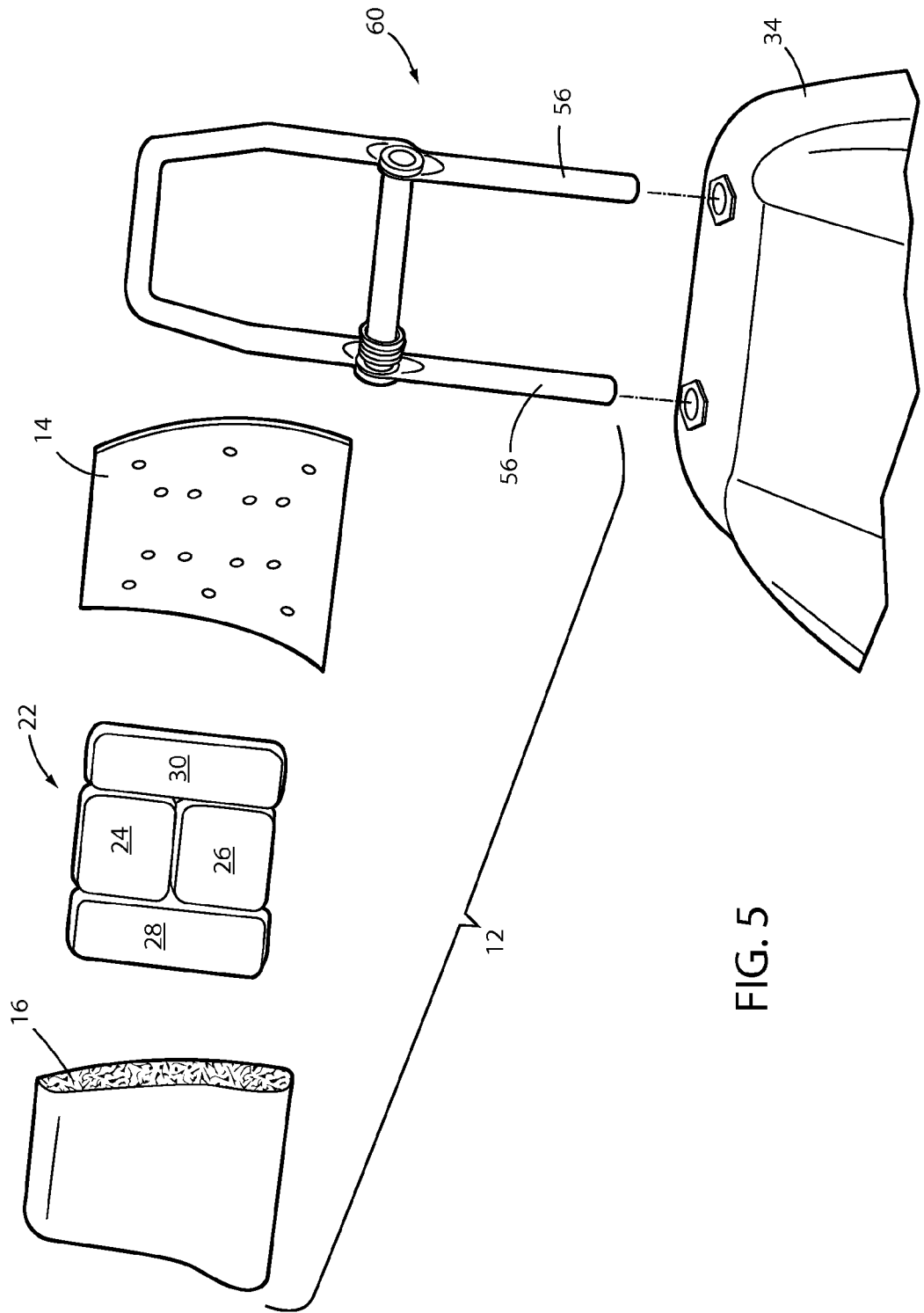
FIG. 5 is an exploded view of the seating assembly of FIG. 1, including the headrest of FIG. 3.

As further illustrated in FIG. 4, supply line 54 may extend through a channel within support member 56, which provides structural support for at least a portion of headrest with respect to seatback 34. In another arrangement, manifold 52 can be disposed within seatback 34 or cushion 32 with a plurality of supply lines 54 and/or portions of inlet lines 50 extending through channel 58 in support member 56. As illustrated in FIG. 5, support member 56 may be a portion of headrest frame 60, which may couple with base layer 14 to provide for additional structural support of headrest 12 as well as coupling of the various components thereof with seatback 34. Manifold 52 may include a plurality of valves (not shown) positioned between respective ones of the inlet lines 50 for cells 24, 26, 28, and 30 and supply line 54. Accordingly, pressurized air within supply line 54 can be selectively routed to desired ones of the cells, 24, 26, 28, and 30 for inflation thereof using the sir provided by supply line 54. Further, the valves within manifold 52 can all be positioned within a closed state to stop or prevent further inflation of bladder assembly 22. Manifold 52 can further include a plurality of release valves that can be opened to the ambient air within headrest 12, and which can be individually opened and closed to alternately deflate the individual cells 24, 26, 28, and 30, as desired, or maintained inflated air within the cells 24, 26, 28, and 30.

A controller (not shown) can be provided within the assembly of seat 10, for example, and can be electronically coupled with manifold 52 and the individual valves associated therewith, to provide electronically controlled opening and closing of the various valves, as desired, to control inflation and deflation of the individual cells 24, 26, 28, and 30 based on user input using the control. Such a control can include various types of electronic circuitry including a printed circuit board, a microprocessor and application-specific integrated circuit ("ASIC"), or the like. In an example, a printed circuit board can be provided within seat 10 and electrically coupled with input pad 62 available for manual operation by an occupant of seat 10, and positioned along a side or other available portion of seat 10. In other examples, various types of digital controls can be provided for access and use by an occupant of seat 10 and connected with a microprocessor-based controller. In an example, such a controller can be included with or electrically connected with a computerized control system for vehicle 48 that can provide other control features therefor in addition to control of the configuration of seat 10. An example of such a commercially available system is the SYNC™ vehicle control system, available through the Ford Motor Company of Dearborn, Mich.

Figure 6:
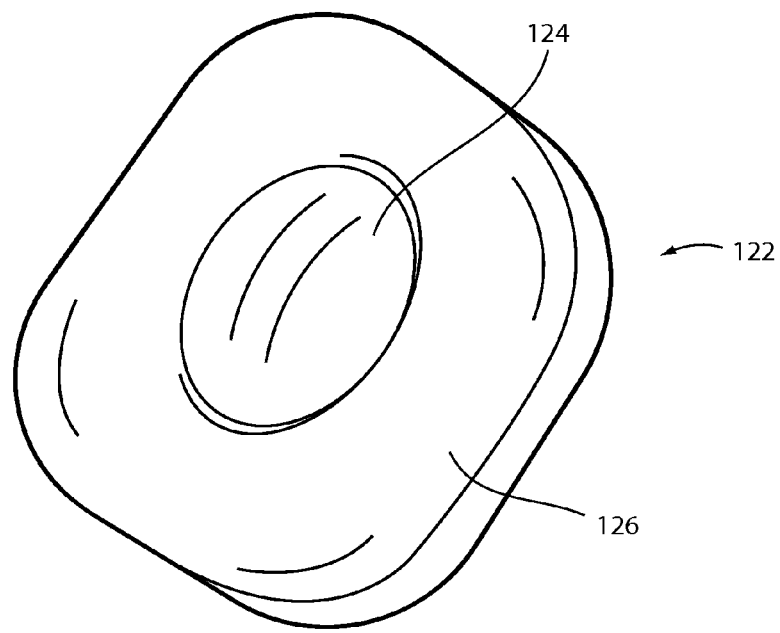
FIG. 6 is a front perspective view of a bladder assembly for an alternative headrest assembly.
Figure 7:
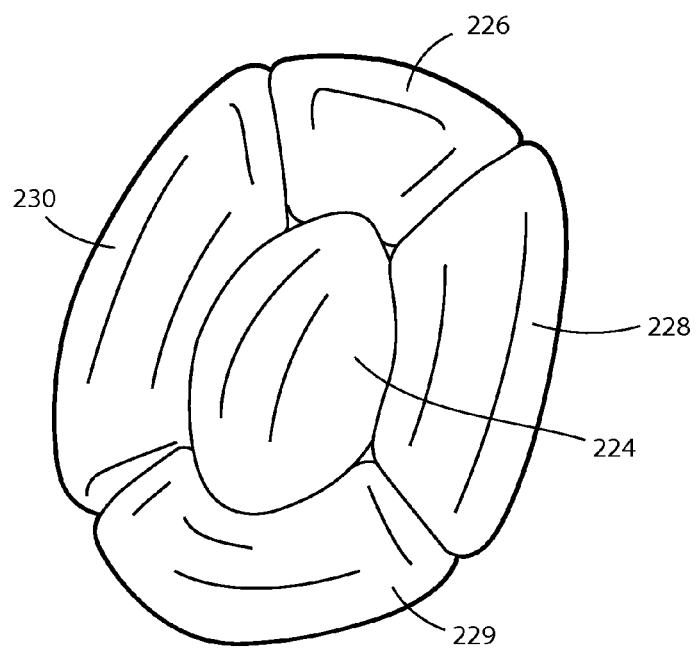
FIG. 7 is a front perspective view of another bladder assembly for a further alternative headrest assembly.

Other similar embodiments of a vehicle seat having an inflatable bladder assembly therein are shown in FIGS. 6 and 7, in which the individual cells are provided in various radial arrangements. For example, in FIG. 6 a bladder assembly 122 is shown having a centrally-disposed cell 24 surrounded by an annular cell 26 that generally surrounds cell 24. In such an embodiment, bladder assembly 122 can be assembled within a headrest within a similar manner to bladder assembly 22 with headrest 12, as discussed above. Further, bladder assembly 122 can provide for independent inward and outward movement of a headrest surface similar to surface 20, discussed above within a central area thereof and an outer area thereof.

In a further variation, FIG. 7 illustrates a bladder assembly 222 having a central cell 224 in a generally circular or disc-shaped configuration with a plurality of outer cells 226, 228, and 229 and 230 and annular segments surrounding central cell 224. As discussed above, each of the cells 224, 226, 228, 229, and 230 can be individually inflated and deflated to give a custom configuration for an overlying headrest surface, which may be similar to surface 20, discussed above. Either of bladder assemblies 122 (FIG. 6) and 222 (FIG. 7) can include a plurality of inlet lines associated with the individual cells thereof, which may be similar to inlet lines 50 discussed above. Further, inlet lines associated with bladder assemblies 122 and 222 can connect with a manifold for selectively providing pressurized air flow from a supply line in an arrangement similar to manifold 52 and supply line 54 discussed above with respect to FIG. 4. Such a manifold can control air flow within the individual inlet lines in a manner similar to those which are discussed above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seating assembly, comprising:
   a pump;
   a headrest, including:
      a support base including first and second support arms, the second support arm having a channel therethrough;
      a flexible foam layer coupled with the support base;
      a flexible substrate overlying the foam layer and defining an outer surface;
      a fluid manifold between the base and the foam layer, the fluid manifold being coupled with the pump by an air supply line extending through the channel and including a plurality of values;
      an inflatable bladder assembly positioned between one of the base and the foam layer or the foam layer and the substrate and having a plurality of cells corresponding to respective regions of the outer surface and coupled with the pump through the fluid manifold with the plurality of cells respectively associated with the plurality of valves to be independently operable between inflated and deflated conditions by the pump; and
      a control operably coupled to the pump and the fluid manifold.

2. The vehicle seating assembly of claim 1, wherein the inflatable bladder assembly includes a plurality of individual bladder units, each of the plurality of individual bladder units defining one of the plurality of cells.

3. The vehicle seating assembly of claim 1, wherein the inflatable bladder assembly includes a single bladder unit defining the plurality of cells.

4. The vehicle seating assembly of claim 1, wherein the control includes a user input.

5. The vehicle seating assembly of claim 1, wherein two of the plurality of cells are disposed on laterally opposite sides of the headrest.

6. The vehicle seating assembly of claim 1, wherein two of the plurality of cells are disposed on vertically opposite sides of the headrest.

7. The vehicle seating assembly of claim 1, wherein at least two of the plurality of cells are radially disposed on the headrest.

8. The vehicle seating assembly of claim 1, wherein:
   the bladder assembly is a first bladder assembly
   the assembly further includes a base and a seatback coupled therewith, a second bladder assembly being coupled with one of the seatback and the base;
   the second bladder assembly defines at least one cell operable between inflated and deflated conditions by the pump; and
   the headrest is coupled with the seatback.

9. A vehicle headrest assembly, comprising:
   a support base including first and second support arms, the second support arm including a channel therethrough;
   a flexible foam layer coupled with the support base;
   a flexible substrate overlying the foam layer and defining an outer surface;
   a fluid manifold positioned between the base and the foam layer, including a plurality of valves, and defining an input coupled with an air supply line extending through the channel;
   an inflatable bladder assembly positioned between the base and the foam layer and including a plurality of cells corresponding to respective regions of the outer surface and coupled with the pump through the fluid manifold with the plurality of values being respectively associate with each of the cells such that the cells are independently operable between inflated and deflated conditions.

10. The vehicle headrest assembly of claim 9, wherein each of the plurality of cells are operable between the inflated and deflated conditions to move portions of the outer surface of the substrate with the respective regions thereof alternately farther from and closer to the support base.

11. The vehicle headrest assembly of claim 9, wherein the inflatable bladder assembly includes a plurality of individual bladder units, each of the plurality of individual bladder units defining one of the plurality of cells.

12. The vehicle headrest assembly of claim 9, wherein the inflatable bladder assembly includes a single bladder unit defining the plurality of cells.

13. The vehicle headrest assembly of claim 9, wherein two of the plurality of cells are disposed on laterally opposite sides of the headrest.

14. The vehicle headrest assembly of claim 9, wherein two of the plurality of cells are disposed on vertically opposite sides of the headrest.

15. The vehicle headrest assembly of claim 9, wherein at least two of the plurality of cells are radially disposed on the headrest.

16. A vehicle headrest assembly, comprising:
   a flexible substrate defining an interior of the headrest assembly and an exterior surface,
   an inflatable bladder assembly within the interior and having a plurality of cells independently operable between inflated and deflated conditions;
   a fluid manifold within the interior and including a plurality of outlets respectively associated with ones of the plurality of cells and an inlet coupled with an air supply line;
   a support base including first and second support arms, the second support arm including a channel therethrough and the air supply line extending through the channel.

17. The headrest assembly of claim 16, further including a flexible foam layer coupled with the support base with the inflatable bladder assembly positioned between the base and the foam layer and a flexible fabric layer overlying the foam layer and defining an outer surface, respective ones of the cells corresponding to regions of the outer surface.

18. The headrest assembly of claim 16, wherein the plurality of cells are arranged in a single unit and includes:
   a first pair of laterally-extending cells being vertically arranged and positioned adjacent each other on opposite sides of a first seam in the unit that defines respective portions of each of the pair of laterally-extending cells;
   a second pair of vertically-extending cells further extending along respective ends of the first pair of cells on opposite sides thereof; and
   a second rectangular seam collectively surrounding the first pair of laterally-extending cells and the second pair of vertically-extending cells.

* * * * *